US012345078B2

(12) United States Patent
Wardi et al.

(10) Patent No.: US 12,345,078 B2
(45) Date of Patent: Jul. 1, 2025

(54) CLOSURE

(71) Applicant: EMKA BESCHLAGTEILE GMBH & CO. KG, Velbert (DE)

(72) Inventors: Florian Wardi, Velbert (DE); Thorsten Kuhnke, Velbert (DE)

(73) Assignee: EMKA BESCHLAGTEILE GMBH & CO. KG, Velbert (DE)

(*) Notice: Subject to any disclaimer, the term of this patent is extended or adjusted under 35 U.S.C. 154(b) by 355 days.

(21) Appl. No.: 17/781,195

(22) PCT Filed: Dec. 1, 2020

(86) PCT No.: PCT/DE2020/101014

§ 371 (c)(1),
(2) Date: May 31, 2022

(87) PCT Pub. No.: WO2021/110213

PCT Pub. Date: Jun. 10, 2021

(65) Prior Publication Data

US 2023/0003061 A1 Jan. 5, 2023

(30) Foreign Application Priority Data

Dec. 6, 2019 (DE) ..................... 10 2019 133 356.3

(51) Int. Cl.
*E05C 3/00* (2006.01)
*E05B 15/02* (2006.01)
*E05C 3/04* (2006.01)

(52) U.S. Cl.
CPC ............ *E05C 3/004* (2013.01); *E05B 15/024* (2013.01); *E05C 3/041* (2013.01)

(58) Field of Classification Search
CPC ......... E05C 3/004; E05C 3/041; E05B 15/024
See application file for complete search history.

(56) References Cited

U.S. PATENT DOCUMENTS

| | | | | |
|---|---|---|---|---|
| 6,327,879 B1 * | 12/2001 | Malsom | E05B 65/0811 | 292/210 |
| 7,604,265 B2 * | 10/2009 | Tsai | E05B 65/0858 | 292/28 |
| 7,905,521 B2 * | 3/2011 | Liang | E05B 65/0858 | 292/199 |

(Continued)

FOREIGN PATENT DOCUMENTS

| | | |
|---|---|---|
| DE | 9208674 | 9/1992 |
| DE | 100 12 959 | 10/2001 |

(Continued)

OTHER PUBLICATIONS

International Preliminary Report on Patentability pertaining to PCT Application No. PCT/DE2020/101014, 6 pages, Jun. 16, 2022.

(Continued)

*Primary Examiner* — Mark A Williams
(74) *Attorney, Agent, or Firm* — Thompson Hine LLP

(57) ABSTRACT

In an exemplary embodiment, a door lock includes a locking latch which is rotatable to and fro between a locking position and an unlocking position; a locking holder that engages the locking latch in a locking position; and a stop that limits the rotational movement of the locking latch; wherein the stop is repositionable and provides different stop positions in different stop receptacles.

13 Claims, 11 Drawing Sheets

(56) References Cited

U.S. PATENT DOCUMENTS

| | | | | |
|---|---|---|---|---|
| 9,010,722 | B2 * | 4/2015 | Hoots | F16K 1/2007 70/180 |
| 9,771,741 | B2 * | 9/2017 | Sljivic | E05B 65/44 |
| 10,378,243 | B2 * | 8/2019 | Ke | E05B 63/042 |
| 2004/0256860 | A1 * | 12/2004 | Tsai | E05C 3/041 292/51 |
| 2007/0259551 | A1 * | 11/2007 | Rebel | E05B 63/0056 439/260 |
| 2013/0099509 | A1 | 4/2013 | Hansen, II et al. | |
| 2018/0058105 | A1 * | 3/2018 | Van Klompenburg | E05B 65/0811 |
| 2018/0291651 | A1 * | 10/2018 | Vande Haar | E05B 47/0012 |
| 2020/0173198 | A1 * | 6/2020 | Stenhouse | E05B 65/0858 |

FOREIGN PATENT DOCUMENTS

| | | |
|---|---|---|
| DE | 20 2013 103 705 | 10/2013 |
| DE | 10 2018 109 593 | 10/2019 |
| EP | 0 668 420 | 8/1995 |
| EP | 3 556 973 | 10/2019 |

OTHER PUBLICATIONS

European Patent Office (ISA/EP), International Search Report (with English translation), International Application No. PCT/DE2020/101014, 5 pages, Mar. 11, 2021.

* cited by examiner

CLOSURE

TECHNICAL FIELD

This disclosure relates to a lock, in particular a door lock, having a locking latch which is rotatable to and fro between a locking position and an unlocking position, a locking holder in which the locking latch can engage in the locking position, and a stop limiting the rotational movement of the locking latch.

BACKGROUND

Such locks are used in many areas of technology, for example for closing flaps, doors, hatches or similar elements. Reference is made hereinbelow to a door, as being representative of these elements.

Corresponding locks usually have a locking latch which is rotatable to and fro between a locking position and an unlocking position and which may be, for example, a casement lock tongue. The locking latch is usually arranged on the inside of a door and can be rotated to and fro between the locking position and the unlocking position from the outside of the door via an actuating element, such as a handle lever.

In the locking position, the locking latch ensures that the door cannot be opened, since in this position the locking latch engages in a frame-side lock holder and the door is thus fixed relative to the door frame. In order to open the door, the locking latch must then first be rotated into the unlocking position in which the locking latch no longer engages in the locking holder and in which the door can be opened relative to the frame.

Furthermore, as a rule, a stop limiting the rotational movement of the locking latch is also provided. When the locking latch is in the unlocking position, it rests against the stop, and therefore no further rotation into the unlocking opening is possible. The background to this stop is that it is often not desirable if the locking latch can be rotated freely, since, for example, the locking latch would then nevertheless engage again in the locking holder in the event of a complete rotation in the unlocking direction. In this respect, the stop can ensure that the locking latch can only be rotated until it reaches the unlocking position and not beyond the latter.

When the locking latch is in the unlocking position, the door can be moved and moved about a mostly vertically oriented pivot axis. There are essentially two types of doors, namely doors hinged on the right, in which the hinge or pivot axis of the door is on the right-hand side, and doors hinged on the left, in which the hinge or pivot axis is on the left-hand side. Although much less common, it is also possible, however, to hinge doors at the top or bottom.

In order to convert a door, for example, from a door hinged on the right to a door hinged on the left, not only do the frame-side elements, such as the locking holder, have to be dismantled and then reassembled on the other side of the frame, but also the door-side elements, such as the locking latch and the actuating elements, would have to be correspondingly exchanged. Such a conversion is therefore quite complex and time-consuming.

However, it is much easier to turn the door around. This is because only the frame-side elements have to be exchanged and the door-side elements are already on the correct side of the door after the turning. However, it has turned out to be disadvantageous that the actuating element may then have a different orientation. This is because if, for example, in the case of a door hinged on the left, a handle lever points downward, it points upward after the door has been turned, and this requires unusual actuation and is therefore undesirable. Since the locks usually have stops that limit the movement of the handle lever or the locking latch, it is often not possible to simply turn the handle lever around by 180 degrees. Although the handle can usually be dismantled and then turned around, dismantling is usually associated with a not inconsiderable amount of work, especially if the screws to be loosened for this purpose are not readily accessible.

Taking this as the starting point, the object of the disclosed closure is to specify a lock that can be adapted more easily.

SUMMARY

In the case of a lock of the type mentioned at the beginning, this object is achieved in that the stop is configured as a repositionable stop which is usable for providing different stop positions in different stop receptacles.

Owing to the configuration of the stop as a repositionable stop, the position of the stop can be changed, for example, depending on whether the door is to be hinged on the left or right, and therefore the lock and thus also the door can be easily converted. For example, a handle lever and thus also the locking latch can be rotated freely into the desired position after removal of the interchangeable stop. Once the desired handle lever position has been reached, the stop can be used in one of the different stop receptacles, selectively and depending on requirements.

To this end, it has proven to be advantageous if the stop is releasably connected to the respective stop receptacles. This enables the stop to be arranged easily and quickly on the respective stop receptacle.

With regard to the positioning of the stop, it has proven to be advantageous if the stop is repositionable from one stop receptacle into another stop receptacle. As a result of this repositioning capability, the stop can be removed, in particular pulled out, from one of the stop receptacles very easily and without the use of an additional tool, and then inserted into the other stop receptacle. This thus enables a very simple and intuitive repositioning of the stop and conversion of the lock. Furthermore, it is also possible for the stop to be screwable or snappable into the respective stop receptacles.

Furthermore, it has proven to be advantageous if the stop is used in a stop position to limit the movement of the locking latch in a door hinged on the left and in a stop position to limit the movement of the locking latch in a door hinged on the right. The stop receptacles or the stop positions assigned to the stop receptacles can accordingly be matched to the door stop, and therefore, to convert the door, the stop can be repositioned from one stop receptacle into another stop receptacle. It has also proven to be advantageous if two stop receptacles are provided, into which the same stop is selectively insertable.

With regard to the configuration of the locking latch, it has proven to be advantageous if the latter is configured as a double locking latch with two latch elements. The configuration as a double locking latch affords the advantage that a locking latch has two different locking positions and unlocking positions. This has also proven to be advantageous with regard to the convertibility. The two latch elements can be opposite one another or offset by 180, and therefore the locking latch can have a propeller-like shape. In the unlocking position, one latch element can engage in the locking holder to lock the door, and, upon a movement into the unlocking position, the other latch element can then strike against a stop, which prevents movement of the locking latch beyond the unlocking position. In this respect it is advantageous if the locking latch and thus also the handle lever do not have to be moved more than 180 degrees during a movement between the locking position and the unlocking position. Alternatively, however, it is also possible for the locking latch to have only one latch element.

With regard to the configuration of the locking latch as a double locking latch, it has proven to be advantageous if one of the two latch elements can engage in the locking holder to lock the door and the other latch element can strike against the stop to limit the rotational movement. Which of the two latch elements engages in the locking holder and which strikes against the stop can depend on the door stop. In the case of a door hinged on the left, for example, the latch element which engages in the locking holder to lock the door can be the latch element which, in the case of a door hinged on the right, strikes against the stop in the unlocking position and prevents further movement of the locking latch in the unlocking direction.

With regard to the locking latch, it has also proven to be advantageous if the latter is rotatably mounted in a latch housing. This permits a simple rotational movement of the locking latch. The locking latch can be moved to and fro between the locking position and the unlocking position, for example via a handle lever, wherein the handle lever can be arranged on the outside of the latch housing and the locking latch can be arranged on the inside of the latch housing. An actuating shaft which connects the handle lever to the locking latch can extend through the latch housing. Furthermore, a transmission can also be provided such that the handle lever is not connected directly to the locking latch, but rather via the transmission. The latch housing can function as a cover and cover the locking latch in such a way that the latter is not visible from the outside. This can prevent manipulations and also protect the internal mechanisms from dirt and external influences. Furthermore, the latch housing can be arranged on the door side, in particular the latch housing can be arranged on an outside of the door.

With regard to the stop receptacles, it has proven to be advantageous if they are arranged on the latch housing. By means of this arrangement, the stop can be arranged very easily in different positions on the latch housing. The other components of the lock then do not have to be changed when carrying out a conversion.

In this context, it has proven to be advantageous if the stop receptacles are configured as insertion openings into which the stop is selectively insertable. The stop can be very easily inserted from the outside through the insertion openings and the latch housing does not have to be dismantled. The corresponding insertion openings can extend from the visible front side of the latch housing, on which the handle is also arranged, into the interior of the latch housing such that they are easily accessible. Furthermore, however, it is also possible for the insertion openings to be closable by means of a cap such that, for example, no contaminants can penetrate into the interior of the latch housing via the insertion openings. Furthermore, the stop can also be screwed, clipped or snapped into the insertion openings. The insertion openings can extend through the front side of the latch housing onto or into the opposite side of the latch housing.

With regard to the configuration of the stop, it has proven to be advantageous if the latter is configured as a stop pin or as a stop screw. Stop pins can thus be very easily inserted selectively into one of the two insertion openings and then correspondingly limit the rotational movement of the locking latch. Stop screws can be screwed into the stop receptacles, which may require the use of a screwdriver, but at the same time the stop can be held particularly securely in the latch housing owing to this configuration.

According to an alternative configuration, it has turned out to be advantageous if the stop receptacles are arranged on the locking holder. This configuration makes it possible for the latch housing not to have to have any insertion openings and in this respect the various stop receptacles are also not visible from the outside. In addition, the stops arranged on the locking holder can be changed only when the door is open. This can lead to better protection against manipulation insofar as the stops are not visible and also not accessible when the door is closed. Nevertheless, the stops can be changed very easily, and in particular by hand, even if the stop receptacles are arranged on the locking holder.

With regard to the configuration of the stop, it has proven to be advantageous if the latter has a locking stop surface for limiting a rotational movement in the locking direction and an unlocking stop surface for limiting the rotational movement in the unlocking direction. This makes it possible for only a single stop to be required both to limit a movement in the locking direction and to limit a movement in the unlocking direction. The stop may have two locking surfaces which face each other and of which only one surface is used, depending on the position of the stop. This may be the unlocking stop surface that faces the locking latch located in the locking position. The surface opposite said unlocking stop surface can bear against the contact surface of the stop receptacle. The unlocking stop surface and the locking stop surface can be arranged perpendicularly to one another. The stop can be in the form of a cube or a parallelepiped, and the two locking stop surfaces can be arranged on opposite sides of the cube or parallelepiped.

With regard to the configuration of the locking holder, it has proven to be advantageous if the latter has a mounting element via which the locking holder is fastenable to a door frame in a mounting plane, a holding element, and a holding surface which is arranged at a distance from the mounting plane and which can be engaged behind by a door-side locking latch to lock the door. A corresponding locking holder configuration has proven successful in the past.

With regard to the holding surface, it has proven to be advantageous if the holding surface and the mounting plane are arranged parallel to one another. This makes it possible for the locking latch also to rest as fully as possible on the holding plane in the locking position, which ensures good force transmission and thus secure support of the locking latch. The holding surface can also be arranged parallel to the surface of the door frame. It is not absolutely necessary for the holding surface to be a flat surface, but rather the holding surface may, for example, also be curved in sections.

In a development of the disclosed closure, it is furthermore proposed that the holding element is connected to the mounting element via two supports. The holding element can be arranged spaced apart from and parallel to the mounting element via these two supports such that the holding element together with the two supports has a substantially C-shaped contour. The two supports can be arranged perpendicularly to the mounting plane and perpendicularly to the holding surface such that the holding surface also runs parallel to the mounting plane. The two supports can be connected to the holding element at the respective edge regions of the latter such that enough space remains between the two supports, and the door-side locking latch can engage behind the holding element or the holding surface during a rotational movement.

Furthermore, it has proven to be advantageous if the holding element is connected integrally to the supports and to the mounting element. The holding element, the supports and the mounting element can thus be produced in one working step and configured, for example, as an injection molded part. This enables simple and cost-effective mass production.

So that the stop can be reliably held at the stop receptacles, it has proven to be advantageous if the stop receptacles can receive the stop in a form-fitting manner such that the stop can then no longer move relative to the stop receptacle at least in one direction, in particular in two directions. However, the stop receptacles can be configured in such a way that the stop can be removed from the stop receptacles counter to the mounting direction. Furthermore, the stop receptacle can have a counterstop against which the stop can rest when it is located in the stop receptacle.

In this regard, it has also proven to be advantageous if the stop receptacle comprises a recess extending into the holding element and/or into the mounting element. The recess can be used to guide the stop such that the latter can be pushed into the stop receptacle in the mounting direction. Accordingly, the recesses can also extend into the holding element and/or into the mounting element in the mounting direction. The mounting direction can extend parallel to the mounting plane and to the holding surface. The recess can be designed as a slot such that the stop can be accommodated in the recess in a form-fitting manner.

Furthermore, it has turned out to be advantageous with regard to the stop receptacle if the latter comprises two recesses extending parallel into the holding element and/or into the mounting element. The holding element can be arranged parallel to the mounting element such that the recesses can ensure reliable mounting of the stop. This configuration has proven successful with regard to reliable holding of the stop.

According to a further preferred embodiment, it has turned out to be advantageous if the stop has guide elements, in particular guide pins, via which it is guided in the recesses. Through the interaction of the guide elements and the recesses, the position of the stop in the stop receptacle can be fixedly defined and even if the locking latch or the latch elements of the locking latch strike against the stop, the locking latch cannot move them. The number of recesses can correspond to the number of guide elements.

Furthermore, it has turned out to be advantageous with regard to the stop receptacle if the latter has a contact surface for contacting the stop. The contact surface can also ensure that the stop is reliably held in the corresponding stop position. The stop surface can be part of a support via which the holding element is connected to the mounting element. The contact surface can be used in particular to absorb forces acting on the stop when the stop has only one insertion element.

To connect the stop to the stop receptacle, it has proven to be advantageous if the stop is connectable to the locking holder via a holding shoe which is pushable onto the holding element. The holding shoe can be latched to the holding element of the locking holder, and therefore, in order to release or to change the position of the stop, the holding shoe must first be removed from the holding element. No additional tool is required either to remove the holding shoe or to remove the stop from the corresponding stop receptacle.

In a structural respect, it has proven to be advantageous if the holding shoe has two limbs of different thickness. The two legs can extend parallel to one another, and, if the holding shoe is connected to the holding element, one limb can be arranged on the side of the holding element facing away from the mounting plane and one limb can be arranged on the side of the holding element facing the mounting plane.

Furthermore, the surfaces of the limbs can be configured as sliding surfaces such that the locking latch can slide on these surfaces during locking or unlocking. During locking and unlocking, the locking latch always slides on the surface of the limb that faces the mounting plane in the corresponding mounting position. Furthermore, it has proven to be advantageous if the holding shoe has a U-shaped cross section. A corresponding cross section allows the holding shoe to be pushed onto the holding element from one direction and in particular to be able to grip the holding element in a form-fitting manner.

With regard to the configuration of the holding shoe, it has proven to be advantageous if the latter has at least one spring arm, via which the holding shoe can latch to the holding element and/or the support or supports. The holding shoe can thus be releasably connected to the holding element via the spring arm and held securely thereon. However, in order to ensure an even distribution of force, at least two spring arms have proven to be advantageous in practice. The spring arm(s) can each have one or more latching lugs, which ensure that the spring arm(s) deform automatically when the holding shoe is pushed onto the holding element and then automatically engage behind the holding element or the supports when the end position is reached. The spring arms and the latching lugs are advantageously configured in such a way that the holding shoe can also then be removed from the holding element again without the additional use of a tool. The spring arms can be arranged on the side of the holding shoe and can grip around the holding element and/or the supports in the mounting positions.

In a further development of the disclosed closure, it has proven to be advantageous if the holding shoe has four spring arms. One spring arm can be arranged on each side of the limb. The four spring arms can have latching lugs that all point in one direction. In the mounting position, the latching lugs of two spring arms can engage behind the holding element, in particular the latching lugs of the spring arms, which are arranged on the side of the narrower limb.

So that the holding shoe can be reliably connected to the holding element, the holding element can have a guide for the holding shoe. The guide can prevent the holding shoe from snagging or tilting as it is being pushed onto the holding element, which in this respect simplifies the mounting and dismantling of the holding shoe even further. The guide can comprise two guide webs, which are used for linear guidance of the holding shoe. The holding shoe can be arranged between these two webs in the connected position. The guide has proven to be particularly advantageous when the holding shoe has four spring arms and/or when the holding shoe is shorter than the holding element.

However, it is furthermore also possible for the holding shoe to extend over the entire length of the holding element. In this case, an additional guide on the holding element is not absolutely necessary, but the spring arms, which can grip the holding element and/or the supports laterally, can serve to correspondingly guide the guide shoe relative to the holding element.

With regard to the configuration of the holding shoe, it has also proven to be advantageous if the holding shoe holds a guide element of the stop in the stop receptacle. The holding shoe can thus ensure that the stop is held securely in the stop receptacle. The corresponding guide element of the stop can extend through the recess of the stop receptacle and then be held or secured in this receptacle by the holding shoe. The holding shoe thus ensures that the stop is received in a form-fitting manner in the stop receptacle. The holding shoe can preferably grip a guide element of the stop at least in sections. In order to grip the guide element of the stop, the holding shoe can have one or more receptacles which, in the connected position, are aligned with the recesses of the stop receptacles in such a way that the holding shoe can be received in a form-fitting manner. The recesses can be designed as slots and extend between the limbs and the spring arms of the holding shoe.

With regard to the connections of the stop to the stop receptacle, it has also proven to be advantageous if the stop has an offset such that a spring arm of the holding shoe can extend through this offset. This configuration makes it possible for the guide element of the stop to be able to be gripped by the holding shoe on both sides of the holding element, and for the stop to thus be held securely in the stop receptacle.

With regard to the object mentioned at the beginning, a door with a lock which is configured in the manner described above is also proposed. The advantages already described with regard to the lock are afforded.

BRIEF DESCRIPTION OF THE DRAWINGS

Further details and advantages of the disclosed closure are explained in more detail below with reference to the accompanying drawings of an exemplary embodiment. In the drawings.

DETAILED DESCRIPTION

Figure 7:
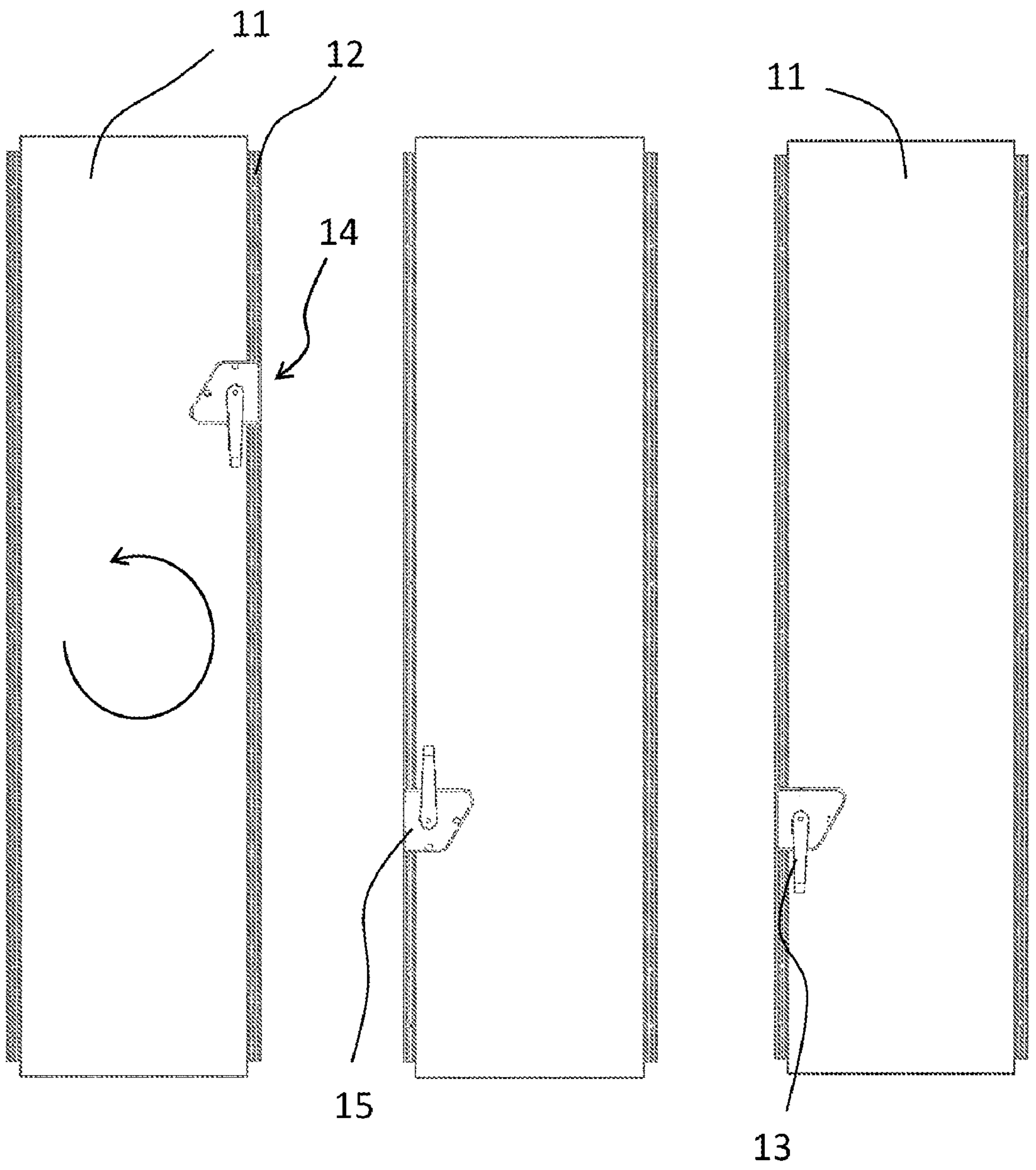
FIG. 7 shows a door arranged in various orientations on a door frame.

In order to fix a door 11 in relation to a door frame 12 such that the door 11 cannot be opened, a lock 14 with a frame-side locking holder 10 and a door-side locking latch 7 is provided, see FIG. 7. The locking latch 7 is rotatably mounted in a latch housing 15 and can be rotated to and fro between a locking position V and an unlocking position E. In the locking position V, the locking latch 7 engages in the locking holder 10 such that the door 11 is fixed relative to the frame 12 and can no longer be opened. In order to open the door 11, the locking latch 7 must first be rotated back again into an unlocking position E, in which the locking latch 7 no longer engages in the locking holder 10. The rotation of the locking latch 7 from the locking position V into the unlocking position E will be explained in more detail below with reference to FIGS. 14*a* to *d.*

Figure 1:
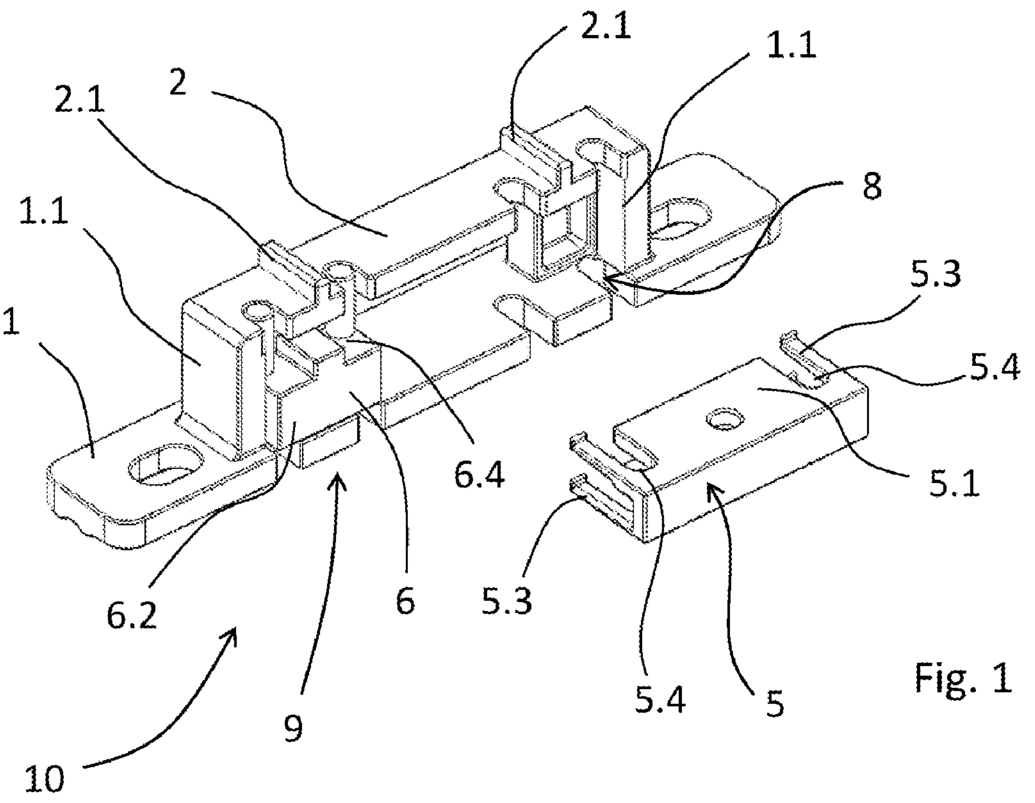
FIG. 1 shows a locking holder in a perspective side view.

First of all, the configuration of the locking holder 10 will now be described with reference to the illustration in FIG. 1. The locking holder 10 has a mounting element 1 which is configured in the manner of a base plate and via which the locking holder 10 can be connected to the frame 12 of a door 11. For this purpose, the elongate mounting element 1 has a bore in the form of a slot on each side, via which the mounting element 1 can be screwed to the door frame 12. Owing to the configuration as a slot, the mounting element 1 can still be displaced within certain limits, even if it is already connected to the frame 12 by screws, as long as the screws are not yet tightened. After the alignment of the mounting element 1, the screws are then tightened, and therefore a substantial movement of the mounting element 1 relative to the frame 12 is then no longer possible. The locking holder 10 can thus be fastened to the door frame 12 in a mounting plane M via the mounting element 1. The mounting plane M then also corresponds to the plane of the surface of the door frame 12, on which the locking holder 10 is mounted.

Furthermore, the locking holder 10 has a holding element 2, which is connected to it via two supports 1.1. Since the two supports 1.1 are at the same height and are arranged perpendicularly on the mounting element 1, the holding element 2 extends substantially parallel to the mounting element 1 or to the mounting plane M.

To lock the door 11, the locking latch 7 is now rotated into the intermediate space between the mounting plane M or the mounting element and the holding element 2 such that the locking latch 7 can no longer be moved in the vertical direction with respect to the mounting plane M and the door 11 is fixed relative to the frame 12. The position of the holding element 2 or the distance between the holding element 2 and the mounting plane M thus defines the closed position of the door 11.

A door seal is arranged between the door 11 and the frame 12, but this is not shown in the figures. Said door seal is compressed in the closed position of the door 11 such that the door 11 does not rattle and is not movable in the closed position. In addition, the seal can also ensure that gas exchange between the interior and the exterior is prevented or at least reduced. Owing to the compression of the seal, the latter exerts at least a certain force on the door 11 in the direction of the open position and thus presses the locking latch 7 from the direction of the mounting element 1 onto the holding element 2. The side of the holding element 2 which faces the mounting plane M then acts as a holding surface 3 on which the locking latch 7 rests in the locked position.

A holding shoe 5 is also provided in order to compensate for manufacturing tolerances or possibly also signs of aging of the seals. The function and the configuration of the holding shoe 5 will be described in more detail below, in particular with regard to FIGS. 1 to 6. First of all, however, it will firstly be described with reference to FIGS. 7 to 14*d* how a door 11 is intended to be converted, for example from a left-hand stop to a right-hand stop.

A door 11 hinged on the left can be seen, for example, in the illustration on the left in FIG. 7. The door 11 has a lock 14 which fixes the door 11 in the locking position V relative to the frame 12 such that the door 11 can then no longer be opened. The corresponding lock 14 has a rotatable locking latch 7 and a locking holder 10, as has already been described above. The middle and the right-hand illustration of FIG. 7 now illustrate how the door 11 hinged on the left can be converted such that it is then hinged on the right.

First of all, for this purpose, the door 11 is completely released from the frame 12 and then rotated through 180 degrees. In doing so, the frame-side elements of the lock 14 must be released from the right-hand side of the frame 12 and then reassembled on the left-hand side of the frame 12. The same can also apply to the door hinges. If the door 11 has then been rotated through 180 degrees and fastened to the frame 12 again, it can be opened again, closed and also locked again via the lock 14. However, as is evident from a comparison of the right and middle illustrations in FIG. 7, when the door 11 is turned around, the orientation of the handle lever 13 also changes. This is because it now no longer points downward but rather upward, which is generally not desired. It will now be described below how the lock 14 can be converted without having to dismantle it or the handle lever 11.

Figure 8A:
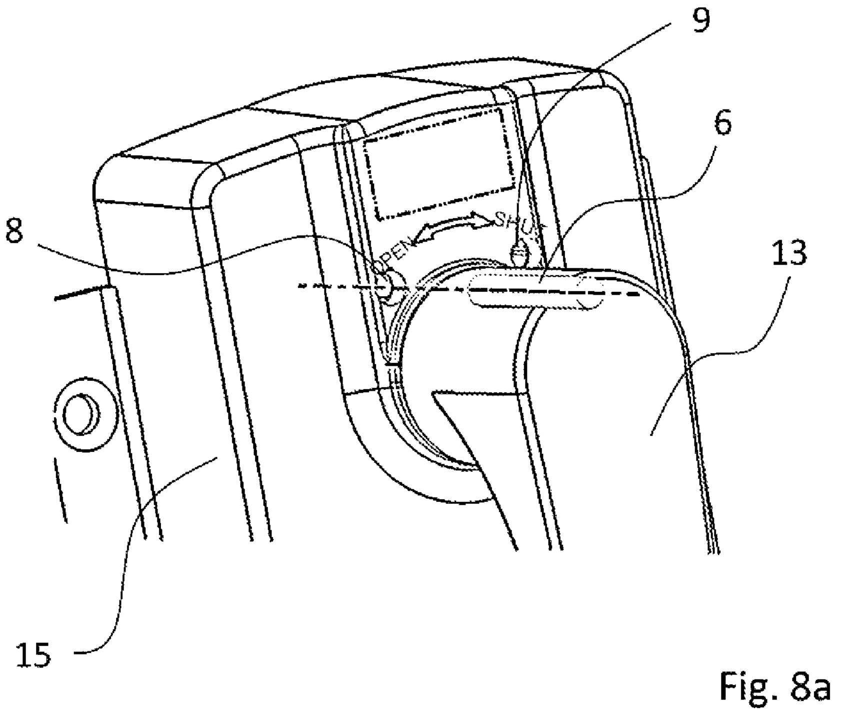
FIGS. 8*a* and 8*b* show perspective views of a latch housing of a lock with a stop in two different positions.
Figure 8B:
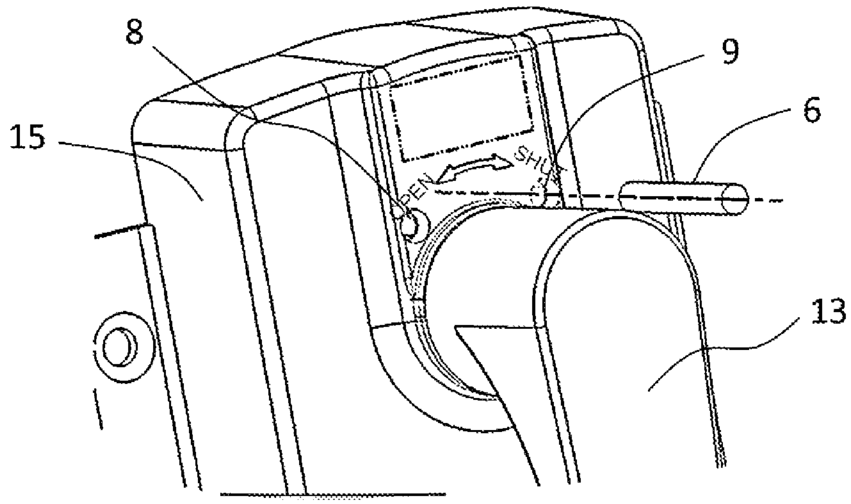

A first embodiment will first be described with reference to FIGS. 8*a, b* and 9*a, b*. FIGS. 8*a, b* show the latch housing 15 with the handle lever 13 arranged thereon, which is rotatably coupled to the locking latch 7 on the inside of the latch housing 15. The latch housing 15 has two stop receptacles 8, 9 which are configured as insertion openings and into which the stop 6 configured as a stop pin is selectively insertable. The inner workings of the latch housing 15 can be seen in FIGS. 9*a* and 9*b*. By positioning the stop 6 in the various stop receptacles 8, 9, a movement of the locking latch 7 can therefore be limited in different ranges of rotation.

Figure 9A:
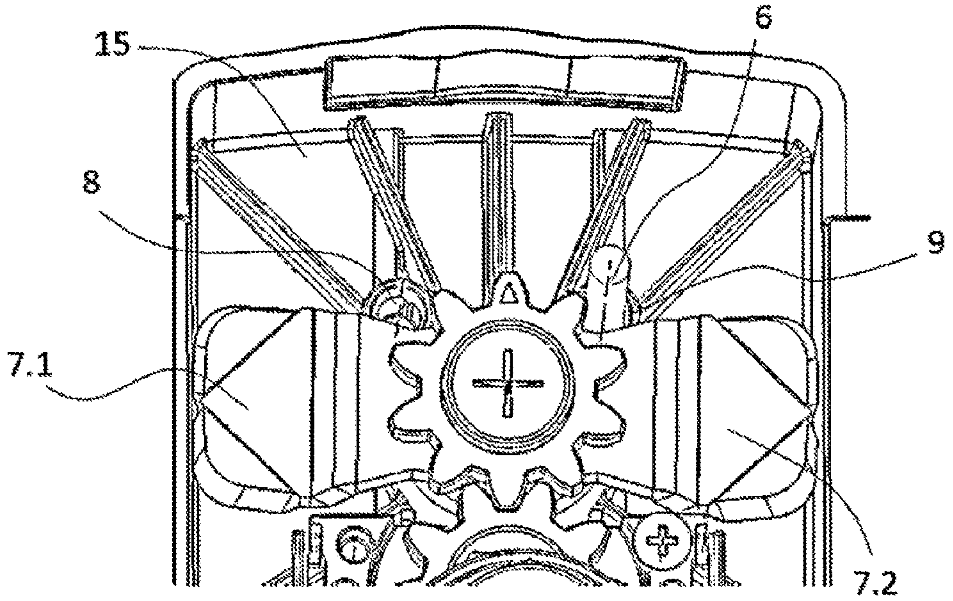
FIGS. 9*a* and 9*b* show sectional views through the latch housing according to FIGS. 8*a* and 8*b;*

The locking latch 7 is shown in a locking position V in FIG. 9*a*. The locking holder 10 is not shown. The locking latch 7 is configured as a double locking latch and has two mutually opposite latch elements 7.1 and 7.2. In the position according to FIG. 9*a*, the latch element 7.2 firstly rests against the stop 6 in the stop receptacle 9 such that the locking latch 7 can only be rotated clockwise, but not counterclockwise, since the stop 6 prevents this rotational movement. If the locking latch 7 is now turned clockwise, the latch element 7.2 is pivoted out of the locking holder 10 (not shown) and the door 11 can be opened. The locking latch 7 can be rotated until the latch element 7.1 rests against the other side of the stop 6. The stop 6 thus prevents the handle lever 13 and thus also the locking latch 7 from being rotated to an extent such that the latch element 7.1 engages in the locking holder 10.

Figure 9B:
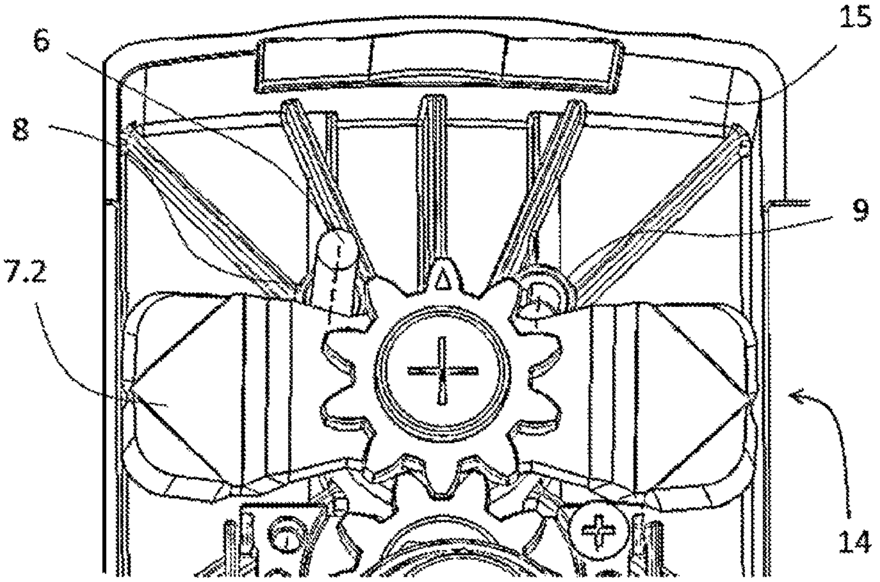

In the illustration of FIG. 9*b*, the stop 6 is inserted into the other stop receptacle 8. From this position, the locking latch 7 can now only be turned counterclockwise, and specifically only until the latch element 7.1 strikes against the right-hand side of the stop 6. Although the locking latch 7 is configured as a double locking latch in the illustrations of FIGS. 9*a* and 9*b*, the device also works to the same extent with locking latches 7 that have only one latch element 7.1. The only difference then is that the handle lever 13 can be pivoted by approximately 180 degrees further than in the embodiment with a double locking latch.

In order now to convert the door 11, for example, from a left-hand door stop to a right-hand door stop, the stop 6 must first be pulled out of the respective stop receptacle 8, 9. The handle lever 13 and the locking latch 7 can then be rotated freely such that the handle lever 13 can be rotated into the desired downwardly pointing position, as can be seen in the right-hand illustration in FIG. 7. In a next step, the stop 6 can then be inserted into the appropriate stop receptacle 8 or 9 and the holes arranged on the outside of the latch housing 15 can be closed, for example using caps.

As an alternative to the arrangement of the stop receptacles 8, 9 or the stop 6 on the latch housing 15, the stop receptacles 8, 9 can also be arranged on the locking holder 10. In this embodiment, the outside of the latch housing 15 no longer has to have insertion openings for the stop 6. This embodiment will be described below first of all with reference to the illustration in FIGS. 11 and 12. As can be seen in particular in FIG. 11, the locking holder 10 has two stop receptacles 8, 9 which are arranged on different sides of the locking holder 10 and which are substantially arranged between the mounting element 1 and the holding element 2. Both the holding element 2 and the mounting element 1 have two recesses 8.1, 9.1 for each of the two stop receptacles 8, 9, which recesses extend in the manner of slots into the mounting element 1 and into the holding element 2 in the mounting direction MR. In this embodiment, the stop 6 has a total of four guide elements 6.3 which are configured in the manner of pins or bolts and which are guided in the recesses 8.1, 9.1 when the stop 6 is inserted into the respective stop receptacle 8, 9. The stop 6 is thus insertable either into the stop receptacle 8 or into the stop receptacle 9 in the mounting direction MR and can accordingly also be removed again from the stop receptacles 8, 9.

The holding shoe 5 is used to fasten the stop 6 to the locking holder 10 and thus has a dual function. This is because the holding shoe 5 serves not only to adjust the distance A1, A2 of the holding surface 3 from the mounting plane M, but also serves to secure the stop 6 in the corresponding stop receptacle 8, 9 of the locking holder 10. As described in more detail below, the holding shoe 5 can be latched to the holding element 2 and/or to the supports 1.1. In this latching position, the receptacles 5.4 arranged between the spring arms 5.3 and the limbs 5.1, 5.2 grip the two upper guide elements 6.3 of the stop 6 and thus hold them in the recesses 8.1, 9.1 of the respective stop receptacle 8, 9. The stop 6 is then received in a form-fitting manner between the holding shoe 5 and the mounting element 1 and the holding element 2. Furthermore, the stop receptacles 8, 9 also have a contact surface 8.2, 9.2, which are each part of one of the supports 1.1. Said contact surfaces 8.2, 9.2 serve as an additional support and thus ensure that the forces acting on the guide elements 6.3 are reduced, in particular when the locking latch 7 strikes against the stop 6. The sectional view of FIG. 12 once again shows how the guide elements 6.3 are received in the mounting receptacle 1, the holding element 2 and the holding shoe 5. The holding shoe 5 gripping the holding element 2 presses the guide element 6.3 both above and below the holding element 2 into the corresponding recess 8.1, 9.1 of the respective stop receptacle 8, 9 and then ensures, when it is latched to the holding element 2 or to the supports 1.1, that the stop 5 is held securely in the corresponding stop receptacle 8, 9.

Figure 11:
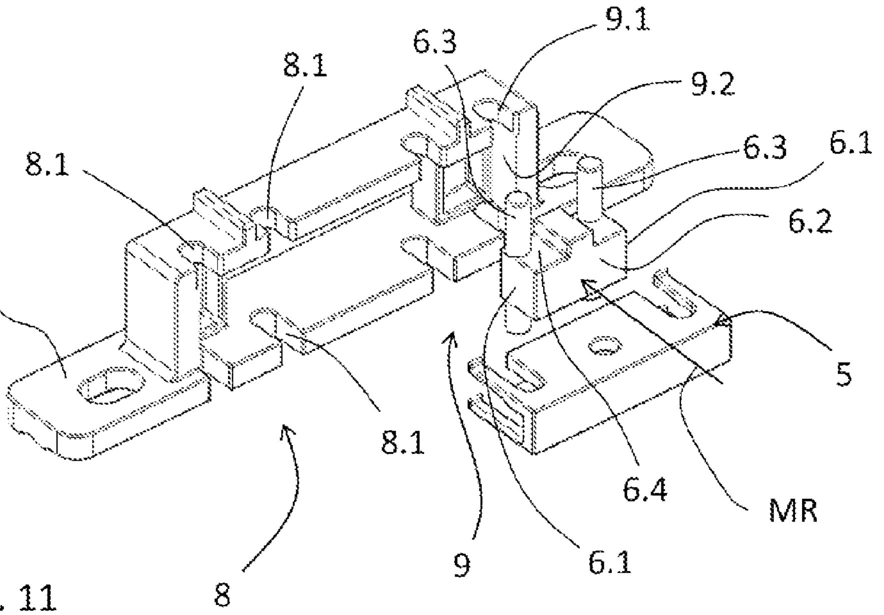
FIG. 11 shows a perspective side view of a locking holder when inserting the stop and when attaching the holding shoe.
Figure 12:
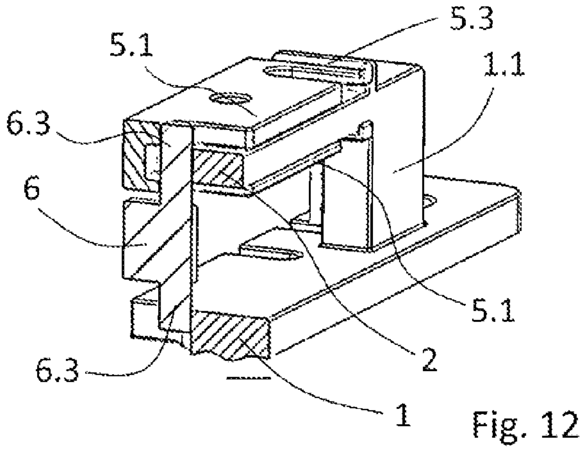
FIG. 12 shows a perspective sectional view through a locking holder with a stop and a holding shoe in a first embodiment.

Furthermore, it can be seen in particular in FIG. 11 that the stop 6 has two offsets 6.4 at the upper end. When the stop 6 is held by the holding shoe 5 in the stop receptacle 8, 9, the lower spring element 5.3 located on the side of the stop receptacle 8, 9 used lies in the offset 6.4, which faces toward the center of the locking holder 10. The offset 6.4 thus ensures that the corresponding guide element 6.3 can also be gripped by the lower receptacle 5.4 below the holding element 2. This can also be seen in the illustration of FIG. 2, in which the stop 6 is arranged in the right-hand stop receptacle 9. If the stop 6 is arranged in the left-hand stop receptacle 8, the holding shoe 5 grips the corresponding other guide element 6.3 of the stop 6.

A further embodiment of the stop 6 and the stop receptacles 8, 9 will now be described below with reference to the illustrations in FIGS. 10*a* to 10*d*. In this embodiment, the holding shoe 5 is longer than the holding shoe 5 shown in FIGS. 2 and 11, and the holding shoe 5 in this embodiment also has only two spring arms 5.3 and not four spring arms 5.3. The stop 5 also differs from the stop 5 described above in that it has only two guide elements 6.3 and the stop receptacles 8, 9 accordingly likewise have only two recesses 8.1, 9.1, one in the mounting element 1 and one in the holding element 2. The mounting element 1 and the holding element 2 are therefore more stable in this configuration.

Figure 13:
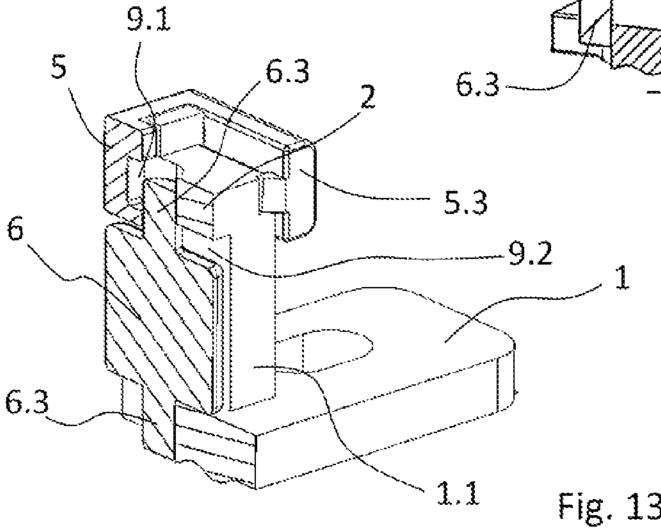
FIG. 13 shows a perspective sectional view through a locking holder with a stop and a holding shoe in a second embodiment.

The holding shoe 5 likewise has a receptacle 5.4 arranged between the spring arms 5.3 and the limbs 5.1, 5.2. In this embodiment, however, the receptacle 5.4 does not serve to hold the guide elements 6.3 in the respective recess 8.1, 9.1, but rather also to grip the supports 1.1 laterally in the manner of a clamp, as already described with regard to the holding element 5. In contrast to the embodiment with the four recesses 8.1, 9.1 per stop receptacle 8, 9, the contact surface 8.2, 9.2 is of greater importance in this embodiment. This is because the contact surface 8.2, 9.2 ensures that the stop 6 does not rotate when the locking latch 7 strikes against it. A corresponding sectional view through the stop 6 and the locking holder 10 is shown in FIG. 13.

Figure 10A:
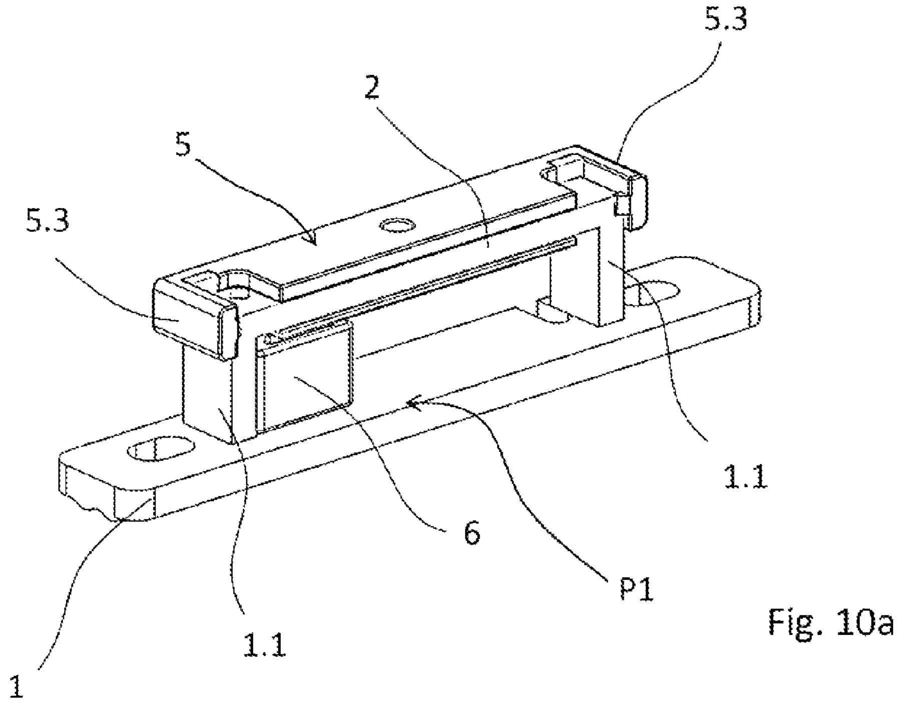
FIGS. 10*a* to 10*d* show perspective views of a locking holder with a stop in two different stop positions.
Figure 10B:
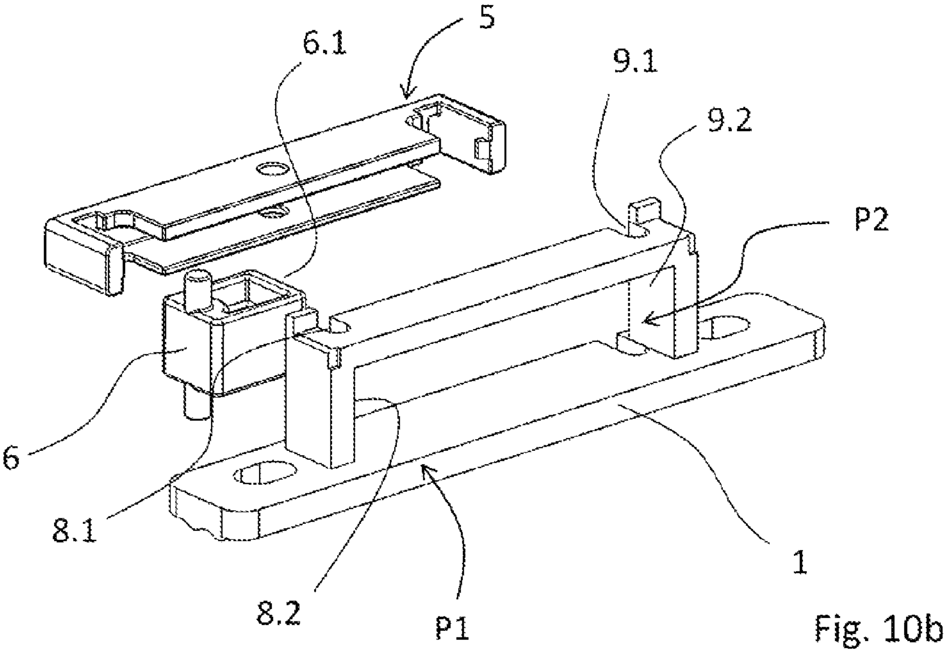
Figure 10C:
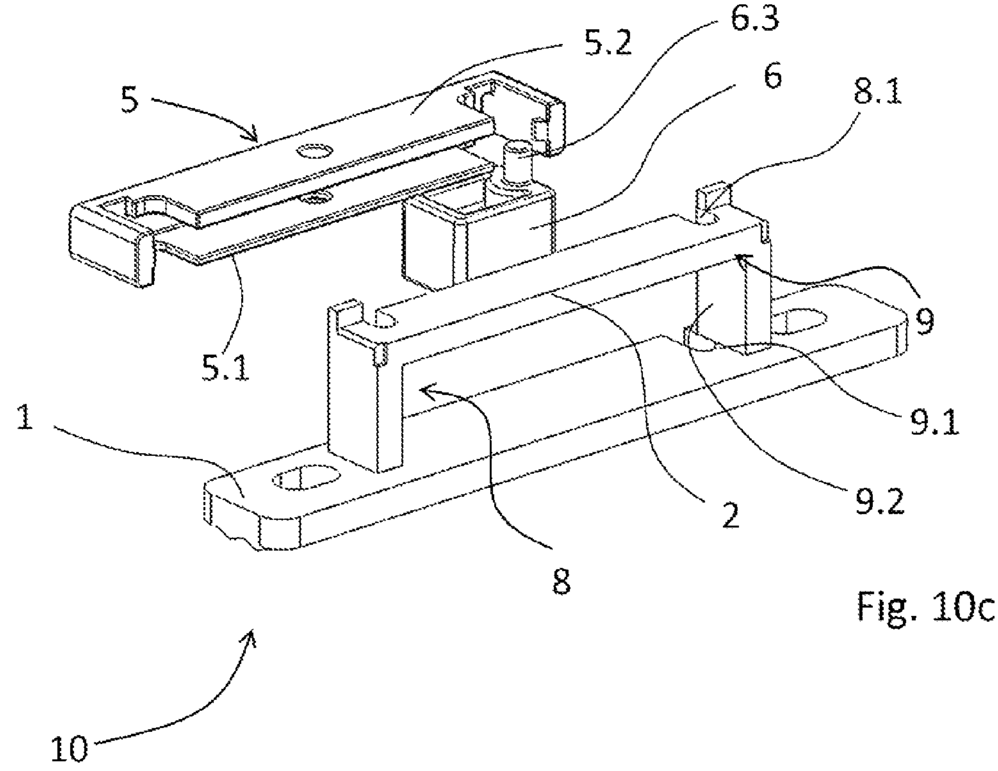
Figure 10D:
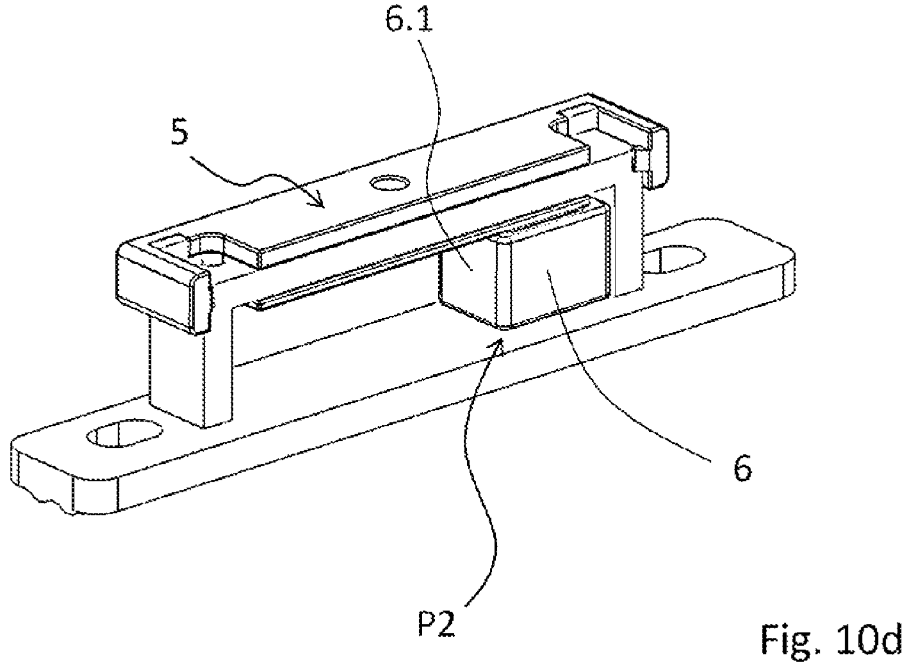

As can also be seen in FIGS. 10*a* to 10*d*, the stop 6 can be switched to and fro between the two stop receptacles 8, 9 as desired. In the illustration of FIG. 10*a*, the stop 6 is initially in the first stop position P1 in the stop receptacle 8. After the holding shoe 5 has been removed from the holding element 2, the stop 6 can be removed from the stop receptacle 8 by hand, rotated through 180 degrees and then inserted into the stop receptacle 9. Finally, the holding shoe 5 is pushed back onto the holding element 2 in order to secure the stop 6 in the stop receptacle 9. This position is shown in FIG. 10*d*.

The unlocking of the lock 14 will now be explained in more detail below with reference to FIGS. 14*a* to 14*d*. In the position shown in FIG. 14*a*, the lock 14 or the locking latch 7 is in the locking position V. The stop 5 is arranged on the locking holder 10 and is inserted in the stop receptacle 9 in the stop position P1. In the locking position V, the latch element 7.1 of the locking latch 7 rests against a locking stop surface 6.1. This stop surface 6.1 can also be seen in FIG. 11, for example. This is the stop surface 6.1 against which the locking latch 7 rests in the locking position V. Depending on the stop position P1, P2, this locking stop surface 6.1 is arranged either on the left or right of the stop 6 and always faces toward the center of the locking holder 10.

Figure 14A:
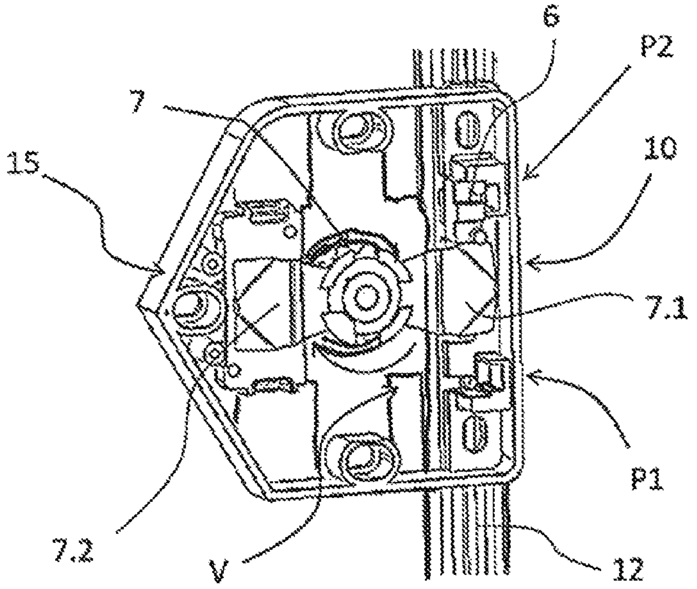
FIGS. 14*a* to 14*d* show different perspective sectional views when unlocking the lock.
Figure 14B:
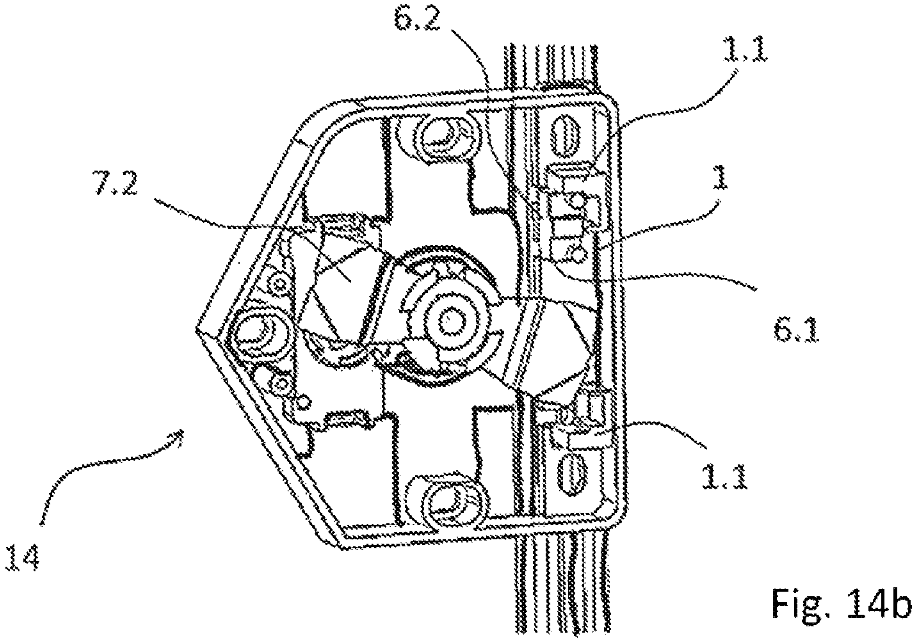
Figure 14C:
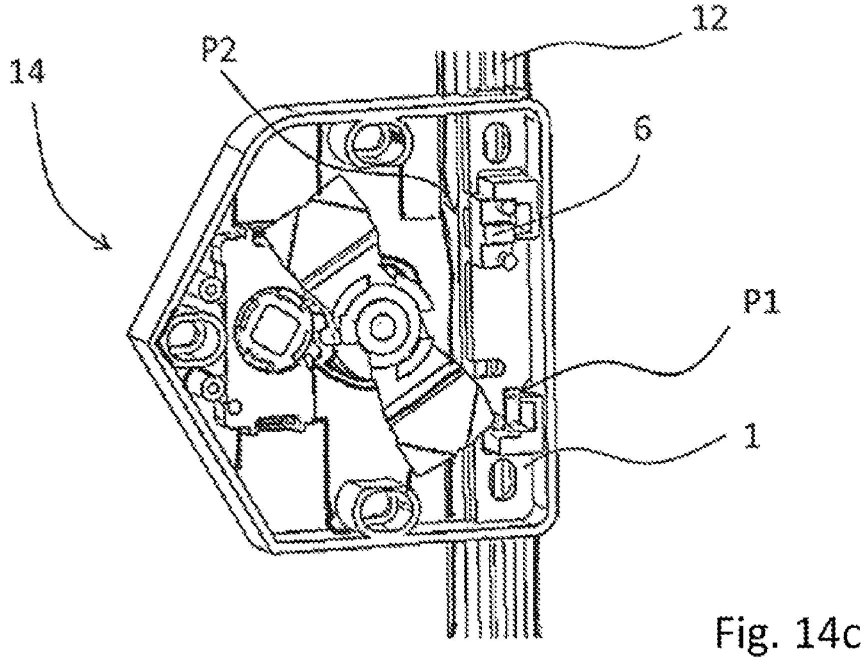
Figure 14D:
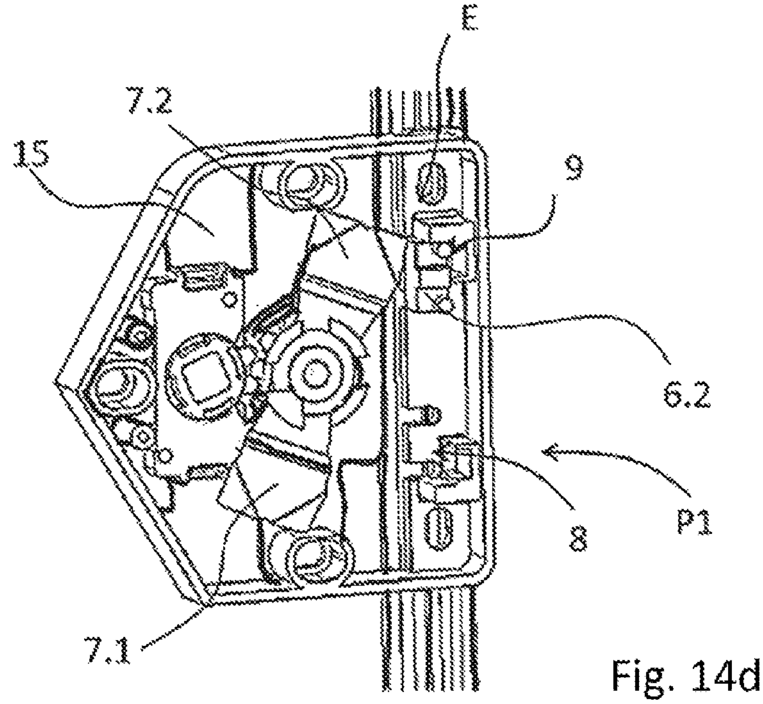

For unlocking purposes, the locking latch 7 must now be rotated clockwise, as indicated by an arrow in FIG. 14*a*. During this rotational movement, it passes through the positions shown in FIGS. 14*b* and *c*. As soon as the latch element 7.1 has then been pivoted out of the locking holder 10 and the latch element 7.1 no longer engages behind the holding surface 3 of the locking holder 10, the door 11 can be opened. This unlocking position E is shown in FIG. 14*d*. It can be seen that, in this position, the latch element 7.2 strikes against the stop 6 or against the unlocking stop surface 6.2 and, as a result, further rotation of the locking latch 7 in the unlocking direction is no longer possible. The unlocking stop surface 6.2 can also be seen in the illustration of FIG. 11.

If the stop 6 is now pulled out of the stop receptacle 9 and inserted into the stop receptacle 8, a different stop pattern results. Starting from the position in FIG. 14*d*, the locking latch 7 is then rotatable further in the clockwise direction until the latch end 7.2 then strikes against the stop 6 located in the stop position P1. In this locking position V, the latch element 7.2 then rests against the locking stop surface 6.1 of the stop. However, the locking stop surface 6.1 is not the same surface against which the latch element 7.1 strikes when the stop 6 is in the stop position P1, as has been described above, but rather the locking stop surface 6.1 lies opposite this surface, as this can also be seen with reference to FIG. 11, for example. If the locking latch 7 is then rotated counterclockwise from this position into the unlocking position E, the latch element 7.1 strikes against the unlocking stop surface 6.2 of the stop 6 and thus limits further rotation of the locking latch 7.

By repositioning the stop 6 between the two stop receptacles 8, 9, the rotational movement of the locking latch 7 can thus be controlled. Since, depending on the stop position, the latch element 7.2 and the latch element 7.1 engage behind the holding surface 3 of the locking holder 10 and the locking holder 10 is connected to the handle lever 13, the position of the handle lever 13 can then also be adjusted in the locking position V and the unlocking position E.

The holding shoe 5 fulfills a dual function and serves to secure the stop 6 in the stop receptacles 8.9, but at the same time the distance between the holding surface 3 and the mounting plane M can also be adjusted via the holding shoe 5. The function and the configuration of the holding shoe 5 with regard to the distance adjustment will now be explained in more detail below with regard to FIGS. 1 to 6.

A door seal is arranged between the door 11 and the frame 12, but this is not shown in the figures. Said door seal is compressed in the closed position of the door 11 such that the door 11 does not rattle and is not movable in the closed position. In addition, the seal can also ensure that gas exchange between the interior and the exterior is prevented or at least reduced. Owing to the compression of the seal, the latter exerts at least a certain force on the door 11 in the direction of the open position and thus presses the locking latch 7 from the direction of the mounting element 1 onto the holding element 2. The side of the holding element 2 which faces the mounting plane M then acts as a holding surface 3 on which the locking latch 7 rests in the locked position.

A holding shoe 5 is also provided in order to compensate for manufacturing tolerances or possibly also signs of aging of the seals. The function and the configuration of the holding shoe 5 will now be described in more detail below, in particular with regard to FIGS. 1 to 6.

The holding shoe 5 is releasably connected to the holding element 2 and can be pushed onto the holding element 2 from the front in a mounting direction MR oriented parallel to the mounting plane M. The intermediate space located between the holding element 2 and the mounting element 1 is reduced by the holding shoe 5, which correspondingly also leads to a displacement of the holding surface 3 in the direction of the mounting plane M. The holding shoe 5 thus leads to the locking latch 1 being located closer to the mounting plane M and thus also closer to the door frame 12 in the locking position V. Accordingly, the door 11 is then also pressed more strongly against the seal in the closed position. As can also be seen, it is not required to connect the holding shoe 5 to the holding element 2 using a tool, but rather the holding shoe can simply be pushed onto the holding element 2 by hand and it then automatically latches to the holding element 2 and/or to the supports 1.1, which will be described in more detail below.

The holding shoe 5 can be connected to the holding element 2 in two different mounting positions M1, M2. The mounting position M1 is shown in the sectional view of FIG. 3 and the mounting position M2 in the sectional view of FIG. 4. It can also be seen that the holding shoe 5 comprises two limbs 5.1 and 5.2, which have a different thickness. The limb 5.1 is significantly thinner than the limb 5.2 and is only about half the thickness of the limb 5.2. Both the illustration of FIG. 3 and that of FIG. 4 involve the same holding shoe 5 in different mounting positions M1, M2. The holding shoe 5 is accordingly pushed onto the holding element 2 in such a way that the thicker limb 5.2 faces the mounting plane M, and the other way around such that the thinner limb 5.1 faces the mounting plane M. The holding shoe 5 was therefore accordingly rotated once by 180 degrees.

Figure 3:
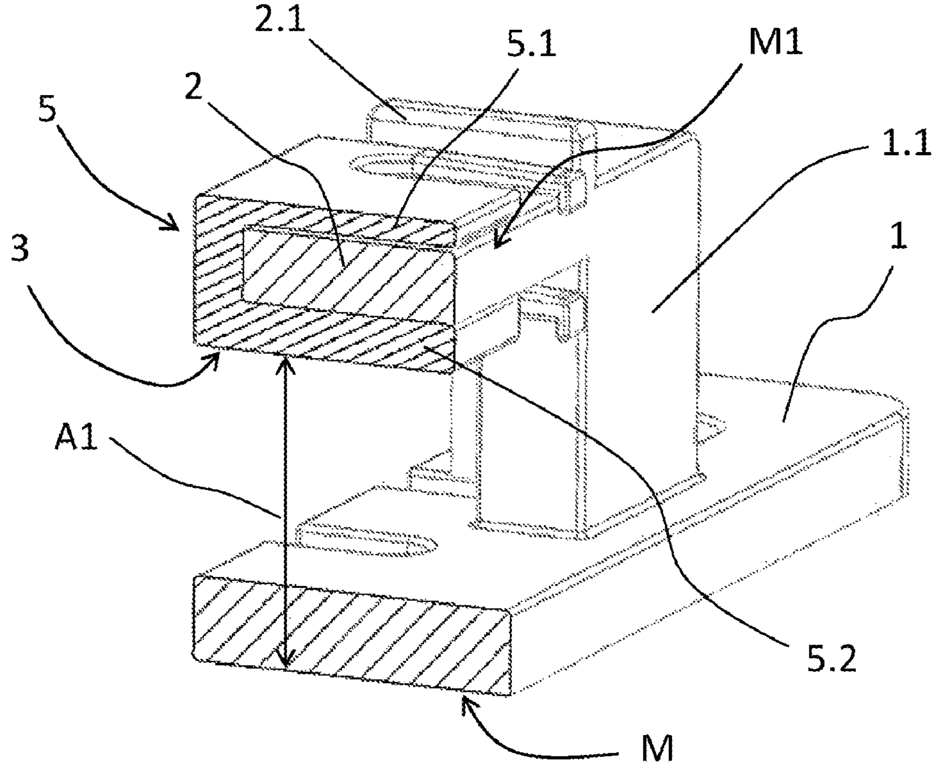
FIG. 3 shows a sectional view of the locking holder with a holding shoe in a first mounting position.
Figure 4:
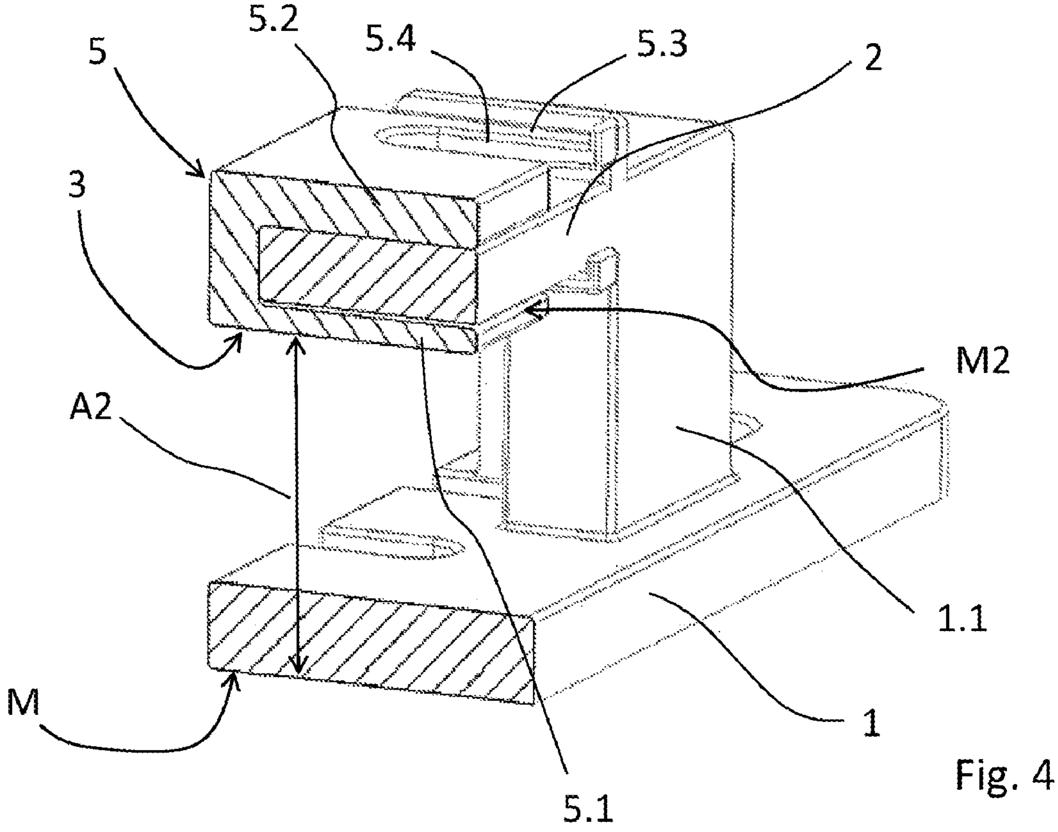
FIG. 4 shows the locking holder according to FIG. 3 in a second mounting position.

Furthermore, it can be seen that, because of the different limb thicknesses, the distance A1, A2 of the holding surface 3 to the mounting plane M is different in each mounting position M1, M2. The holding surface 3 refers in each case to the surface of the limb 5.1, 5.2 against which the locking latch 7 rests in the locked position, i.e. in each case that surface of the holding shoe 5 which faces the mounting plane M. Owing to the fact that the thicker limb 5.2 faces the mounting plane M in the mounting position M1, the distance A1 of the holding surface 3 relative to the mounting plane M is correspondingly also smaller than in the second mounting position M2. This also becomes clear when comparing the two distances A1 and A2 in the different mounting positions M1 and M2 which are shown in FIGS. 3 and 4. The holding shoe 5 thus creates the possibility of adjusting the distance between the holding surface 3 and the mounting plane M in three different steps. If no holding shoe 5 is used, the distance is at its largest and the locking latch 7 engages behind the holding element 2 in the locking position V and then rests against it. If the holding shoe 5 is used in the first mounting position M1, the distance is reduced to the distance A1, and, if the holding shoe 5 is used in the second mounting position M2, the distance is reduced even further to the distance A2.

Figure 2:
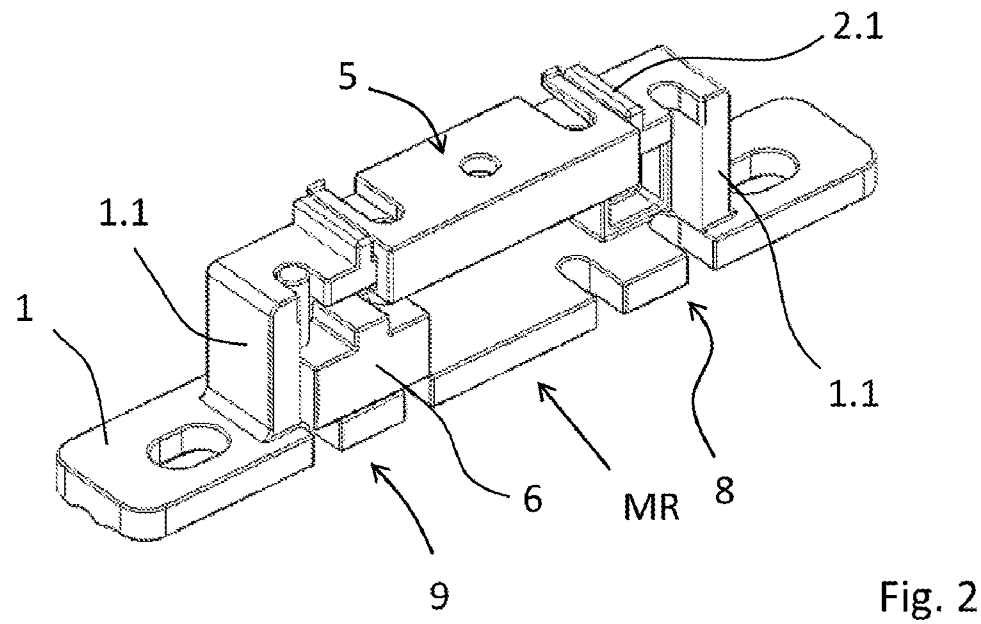
FIG. 2 shows the locking holder according to FIG. 1 with an pushed-on holding shoe.
Figure 5:
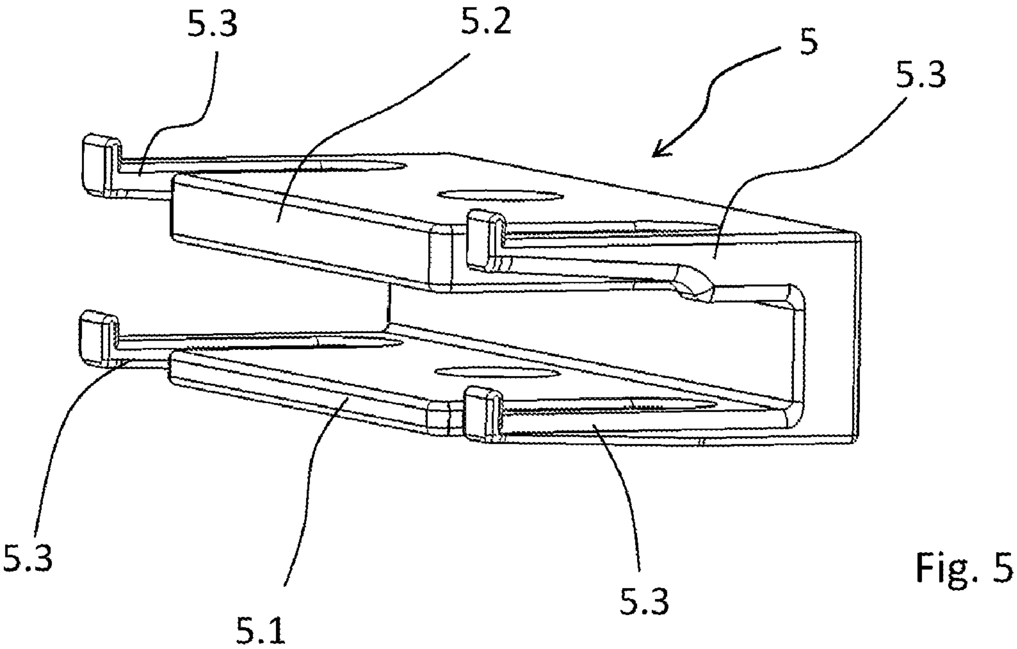
FIG. 5 shows a perspective side view of the holding shoe in a first embodiment.
Figure 6:
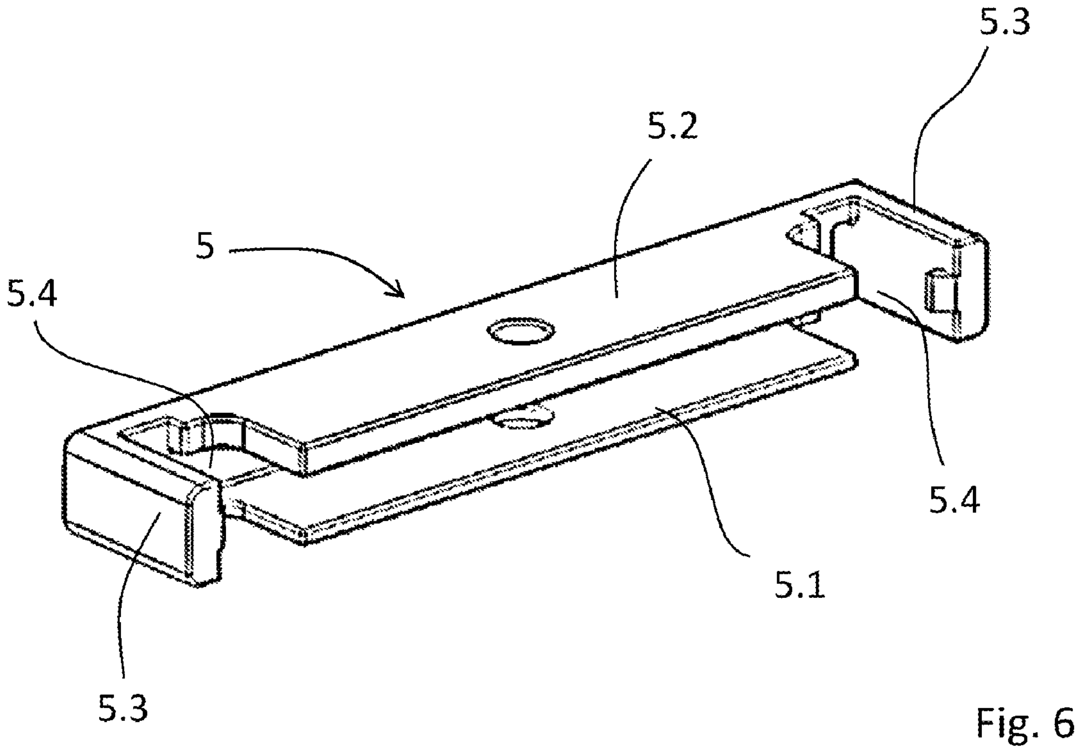
FIG. 6 shows a perspective side view of the holding shoe in a second embodiment.

FIGS. 5 and 6 now show two differently configured holding shoes 5. The holding shoe 5 according to FIG. 5 corresponds to that which is also shown in FIGS. 1 and 2. The two limbs 5.1, 5.2 are parallel to one another and grip the holding element 2 in the pushed-on position. So that the holding element 5 can be pushed onto the holding element 2 as reliably as possible, the holding element 2 has a guide 2.1 which consists of two parallel webs, as can be seen in the illustration in FIG. 1. In the pushed-on position, the holding shoe 5 then lies between these two webs, which insofar serve as a linear guide.

So that the holding shoe 5 is also reliably held on the holding element 2 when the locking latch 7 is moved into the unlocking position E and thereby slides onto the holding shoe 5, the holding shoe 5 has four spring arms 5.3, one of which is located on each side of the two limbs 5.1, 5.2. So that the spring arms 5.3 can latch to the holding element 2, each spring arm 5 has a latching lug, of which two then grip behind the holding element 2, depending on the mounting position M1, M2 of the holding shoe 5, as can be seen in the illustration of FIGS. 3 and 4. The latching lugs of all four spring arms 5.3 point in the same direction. Furthermore, the holding shoe 5 has receptacles 5.4 which extend between the spring arms 5.3 and the limbs 5.1, 5.2 and which can be clearly seen in the illustration in FIG. 1. The function of these receptacles 5.4 has already been discussed in more detail above with regard to the stop 6.

FIG. 6 shows the holding shoe 5 in a second embodiment. The limbs 5.1, 5.2 of this embodiment also extend parallel to one another and grip the holding element 2 from above and from below. In contrast to the holding shoe 5 according to FIG. 5, however, in this embodiment the holding shoe 5 has only two spring arms 5.3, which extend over the entire height of the holding shoe 5. This holding shoe 5 is also longer, and therefore it can grip the entire holding element 2 with the spring arms 5.2, as can be seen in the illustrations of FIGS. 10*a* and 10*b*. Since this holding shoe 5, as it is being pushed on, is guided over the spring arms 5.3 lying laterally on the holding element 5 or on the supports 1.1, an additional guide 2.1 is not absolutely necessary on the holding element 2 in this embodiment.

Furthermore, it can be seen in FIGS. 10*a* and 10*b* that the two spring arms 5.3 each have a latching lug, said latching lugs facing one another. Said latching lugs grip the holding element 2 or the supports 1.1 and then ensure, in a manner entirely analogous to the spring arms 5.3 described with regard to the configuration according to FIG. 5, that the holding shoe 5 is held securely on the holding element 2. Furthermore, in this embodiment, the holding element 2 has notches in the upper end region, in which the latching lugs of the spring arms 5.3 can engage. The corresponding notches can be seen, for example, in FIG. 10*b*.

With regard to the choice of material for the holding shoe 5, materials that have good sliding properties have proven to be particularly advantageous in practice. There are essentially two reasons for this. The locking latches 7 have to have a high level of strength and are therefore as a rule made of metal and, to prevent corrosion, mostly made of galvanized metal. Since the locking latch 7, as it engages behind the holding surface 3, now slides on this surface, the galvanized surface of the locking latch 7 may be abraded, which is then associated with an increased risk of corrosion. If the holding shoe 5 and in particular the corresponding surfaces of the holding shoe 5, on which the locking latch 7 slides, have good sliding properties, this reduces the risk of material abrasion.

In addition, if the locking latch 7 presses too hard on the holding surface 3, the holding shoe 5 may also entrain the holding shoe 5, when the locking latch 7 is rotated into the unlocking position E, and thus pulls it from the holding element 2. In this respect, good sliding properties also allow the holding shoe 5 to be able to be held securely on the holding element 2. Possible materials for the holding shoe 5 are, for example, plastic, in particular POM, brass or bronze. Furthermore, surface coatings can also be used to improve the sliding properties.

REFERENCE SIGNS

1 Mounting element
1.1 Support
2 Holding element
2.1 Guide
3 Holding surface
4 Holding shoe
5.1 Limb
5.2 Limb
5.3 Spring arm
5.4 Receptacle
5 Stop

6.1 Locking stop surface
6.2 Unlocking stop surface
6.3 Guide element
6.4 Offset
6 Locking latch
7.1 Latch element
7.2 Latch element
7 Stop receptacle
8.1 Recess
8.2 Contact surface
8 Stop receptacle
9.1 Recess
9.2 Contact surface
9 Locking holder
10 Door
11 Door frame
12 Handle lever
13 Lock
14 Latch housing
A1 Distance
A2 Distance
M Mounting plane
MR Mounting direction
M1 Mounting position
M2 Mounting position
V Locking position
E Unlocking position
P1 Stop position
P2 Stop position

What is claimed is:

1. A door lock, comprising:
a locking latch;
a locking holder, wherein the locking latch is rotatable relative to the locking holder between a locking position and an unlocking position, wherein the locking holder is configured to engage the locking latch when the locking latch is in the locking position to form a locking engagement therebetween; and
a stop that is configured to engage the locking latch at a stop position to limit rotational movement of the locking latch, wherein the stop is positionable in different stop receptacle to provide different stop positions, and wherein the stop receptacles are arranged on the locking holder.

2. The lock of claim 1, wherein the stop is repositionable from one stop receptacle into another stop receptacle.

3. The lock of claim 1, wherein the locking latch has two latch elements, and wherein the door lock is configured such that either of the two latch elements is engageable by the locking latch to form the locking engagement between the locking latch and the locking holder.

4. The lock of claim 3, wherein the lock is configured such that one of the two latch elements is engaged by the locking holder to lock the door while the other latch element strikes against the stop to limit the rotational movement of the locking latch.

5. The lock of claim 1, wherein the locking latch is rotatably mounted in a latch housing.

6. The lock as claimed in claim 1, wherein the stop receptacles are configured as insertion openings into which the stop is selectively insertable.

7. The lock of claim 1, wherein the stop includes a locking stop surface for limiting a rotational movement of the locking latch in the locking direction and an unlocking stop surface for limiting the rotational movement of the locking latch in the unlocking direction.

8. The lock as claimed in claim 1, wherein the locking holder includes a mounting element in which the locking holder is fastenable to a door frame in a mounting plane, a holding element, and a holding surface which is arranged at a distance from the mounting plane and which can be engaged behind by the locking latch to lock the door.

9. The lock as claimed in claim 8, wherein each stop receptacle includes a recess extending into the holding element and/or into the mounting element.

10. The lock of claim 9, wherein the stop includes a guide element that is guided in the recess.

11. The lock of claim 1, wherein the stop is connectable to the locking holder via a holding shoe that is pushable onto a holding element of the locking holder.

12. The lock as claimed in claim 11, wherein the holding shoe holds a guide element of the stop in the associated stop receptacle.

13. A door, comprising:
a lock having a locking latch;
a locking holder, wherein the locking latch is rotatable relative to the locking holder between a locking position and an unlocking position, wherein the locking holder is configured to engage the locking latch when the locking latch is in a locking position; and
a stop that is configured to engage the locking latch at a stop position to limit the rotational movement of the locking latch, wherein the stop is positionable in different stop receptacles to provide different stop positions, and wherein the stop receptacles are arranged on the locking holder.

* * * * *